(12) United States Patent
Grant et al.

(10) Patent No.: US 6,183,381 B1
(45) Date of Patent: *Feb. 6, 2001

(54) FIBER-REINFORCED METAL STRIKING INSERT FOR GOLF CLUB HEADS

(75) Inventors: William F. Grant, Londonderry, NH (US); Stephen A. Kraus, San Diego, CA (US); Thomas W. Shahood, Jr., Dunstable, MA (US)

(73) Assignee: Textron Systems Corporation, Wilmington, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/115,570

(22) Filed: Jul. 14, 1998

Related U.S. Application Data

(63) Continuation-in-part of application No. 08/420,966, filed on Apr. 13, 1995, now Pat. No. 5,779,560.

(51) Int. Cl.$^7$ ..................................................... A63B 53/04
(52) U.S. Cl. ........................................... 473/342; 348/349
(58) Field of Search ...................................... 473/324, 342, 473/347, 348, 349, 289, 290, 291, 131, 350, 329, 332, 330, 331; 273/DIG. 22, DIG. 23

(56) References Cited

U.S. PATENT DOCUMENTS

| 4,792,139 | | 12/1988 | Nagasaki et al. . |
| 5,037,102 | * | 8/1991 | Fukayama . |
| 5,078,397 | | 1/1992 | Aizawa . |
| 5,154,425 | | 10/1992 | Niskanen et al. . |
| 5,403,007 | * | 4/1995 | Chen . |
| 5,779,560 | * | 7/1998 | Buck . |

FOREIGN PATENT DOCUMENTS

| 0540214A1 | 5/1993 | (EP) . |
| 2259863A | 3/1993 | (GB) . |
| 2264439A | 9/1993 | (GB) . |

\* cited by examiner

*Primary Examiner*—Sebastiano Passaniti
(74) *Attorney, Agent, or Firm*—Hamilton, Brook, Smith & Reynolds, P.C.

(57) ABSTRACT

A golf club head insert is disclosed comprising a fiber-reinforced metal matrix. Also disclosed is a golf club comprising a main body member, a strike face of a fiber reinforced metal matrix insert, and a way for joining the fiber reinforced metal matrix composite insert to the main body member.

11 Claims, 2 Drawing Sheets

FIBER-REINFORCED METAL STRIKING INSERT FOR GOLF CLUB HEADS

RELATED APPLICATIONS

This is a continuation-in-part of U.S. patent application Ser. No. 08/420,966, filed on Apr. 13, 1995, and issued as U.S. Pat. No. 5,779,560 on Jul. 14, 1998, which is incorporated in its entirety herein by reference.

BACKGROUND OF THE INVENTION

Golf clubs were historically categorized as either woods or irons depending on the composition of the materials used to form the heads. Although the categories of woods and irons have continued, the materials have changed drastically. An active field for players have driven the technology of fabricating golf clubs heads a far way from the original designs.

Along the way, metal was used to construct woods and the terminology "metal woods" came into usage. Both woods and irons were improved by a long shot as they began to be constructed from composite materials, as opposed to monolithic metals. In one form or another, these changes were designed to extend the life of the ball striking surface of the golf club head, to give an adjustable center of gravity, to selectively weight the perimeter of the golf club head so that the largest possible "sweet spot" could be achieved, to provide the desirable sonic characteristic when the golf club hits the ball, to provide an increase in the inertial moment of the golf club head during the swing, and/or to provide a feel of a solid impact and control when the club is swung and strikes the ball. Ideally, these goals are achieved without changing the basic look of the golf club head so that the player recognizes the club as either a wood or an iron.

However, what is needed is a golf club striking surface that provides maximum ball striking surface strength and stiffness and also resistance to deformation when a golf club head strikes a ball.

SUMMARY OF THE INVENTION

This invention relates to a golf club head insert for striking a golf ball on a strike face of the insert, comprising a fiber-reinforced metal matrix. This invention also relates to a golf club comprising a main body member, a strike face of a fiber reinforced metal matrix insert, and means for joining the fiber reinforced metal matrix composite insert to the main body member.

The advantage of this invention is that such a composite construction provides a strike face characterized by up to a 20 percent increase in stiffness and up to a 30 percent decrease in weight of the strike face, relative to an equivalent strike face comprising an equivalent metal without fiber reinforcement. This provides a lighter strike face which allows additional perimeter weighting, additional controls of the center of gravity, a lighter head and an improved feel and/or more desirable sonic characteristics.

DETAILED DESCRIPTION OF THE INVENTION

The features and other details of the invention will now be more particularly described with reference to the accompanying drawings and pointed out in the claims. The same number present in different figures represents the same item. It will be understood that the particular embodiments of the invention are shown by way of illustration and not as limitations of the invention. The principle features of this invention can be employed in various embodiments without departing from the scope of the present invention.

Figure 1:
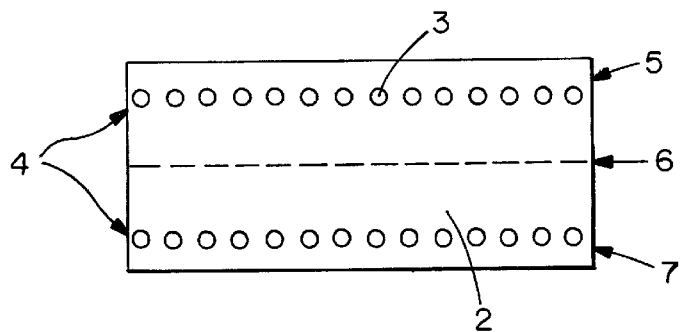
FIG. 1 is a cross sectional view of a representative fiber-reinforced metal composite strike face insert of the present invention.

Referring to FIG. 1, composite insert 1 consists of a metal matrix 2, containing high modulus, high strength reinforcing fibers 3 disposed therein in one or more pairs of planar arrays 4. Preferably, the metal matrix is formed from titanium or a titanium alloy.

Alternately, other metal matrices 2 suitable for use in the present invention include aluminum, aluminum alloys, magnesium, magnesium alloys, beryllium, beryllium alloys, or combinations thereof, including combinations with titanium or titanium alloys.

Within the planar arrays 4, each reinforcing fiber 3 is typically parallel in orientation to the other reinforcing fibers 3 within the array 4.

Examples of suitable reinforcing fibers 3 include fibers containing boron, carbon, graphite or ceramics. Preferably, reinforcing fibers 3 are silicon carbide containing fibers.

Alternately, combinations of types of fibers may also be used within planar array 4.

It is also preferred that reinforcing fibers 3 have a modulus of at least about 30 Mpsi and that each fiber 3 is a continuous length of fiber.

Each planar array 4 of reinforcing fibers 3 within a pair is disposed (a) substantially perpendicular to the strike face 5 of the composite insert 1, (b) equidistantly from, but on opposite sides of, the plane of the insert's centerline 6, and (c) at a distance from the strike face surface 5 and the insert's opposing surface 7 greater than the depth of the grooves subsequently cut into strike face 5.

The plane of the insert's centerline 6 is substantially parallel to strike face 5.

Figure 2:
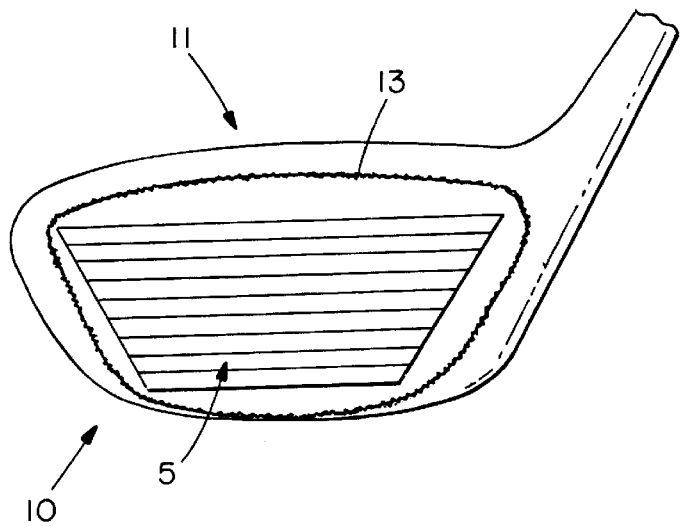
FIG. 2 is a side elevational view of embodiment of the invention representing a metal wood golf club head constructed with a fiber reinforced metal strike face insert.
Figure 4:
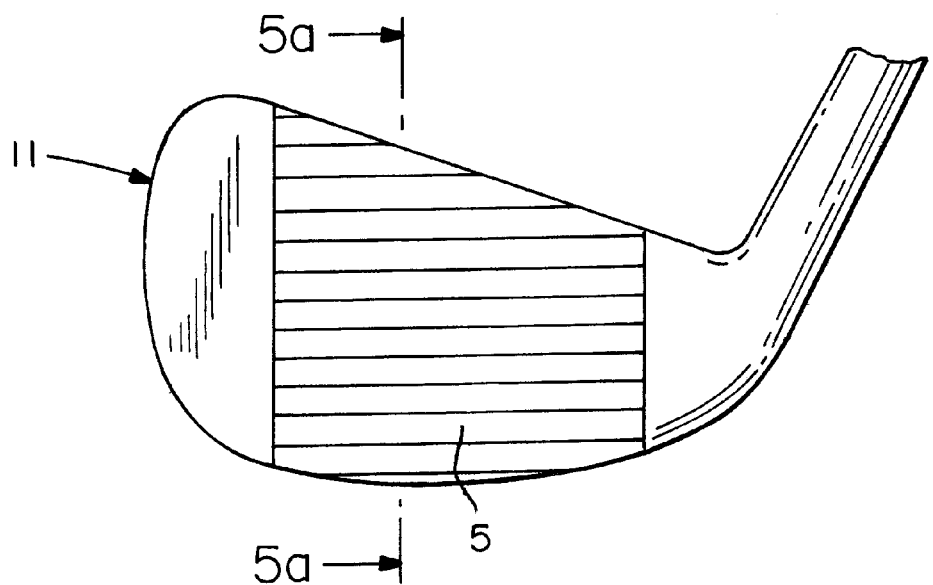
FIG. 4 is an elevation showing an iron golf club head incorporating the fiber reinforced metal strike face insert of the invention.

The absence of reinforcing fiber 3 along the strike face 5 permits the machining of the strike face grooves 8, as shown in FIG. 2 and FIG. 4, into the strike face 5.

In a preferred embodiment the planar arrays 4 of reinforcing fibers 3 are as near the strike face 5, or opposing surface 7, as possible, and as far from the centerline 6 as possible. More preferably, the distance between strike face 5 and planar array 4 of reinforcing fibers 3 is between about 0.005 to about 0.04 inches.

In addition, an orientation of reinforcing fibers 3 suitable for providing a maximum strike face 5 strength and stiffness is preferred and may be selected by the practitioner. For example, with silicon carbide reinforcing fibers, an orientation of 90° from the long direction (toe to heel) of the strike face 5 is most preferred. Alternately, an orientation of 45° to 135° from the long direction of the strike face 5 is also preferred.

In an even more preferred embodiment, a silicon carbide fiber reinforced titanium composite serves as the club strike face or hitting surface of metal wood or iron golf clubs. A titanium composite laminate insert provides increased strength and stiffness at lower material densities. The high strength and light weight of the titanium composite insert further allows redistribution of existing club head weight to selective perimeter and sole plate locations, thereby permitting alteration of the club head center of gravity.

Figure 3:
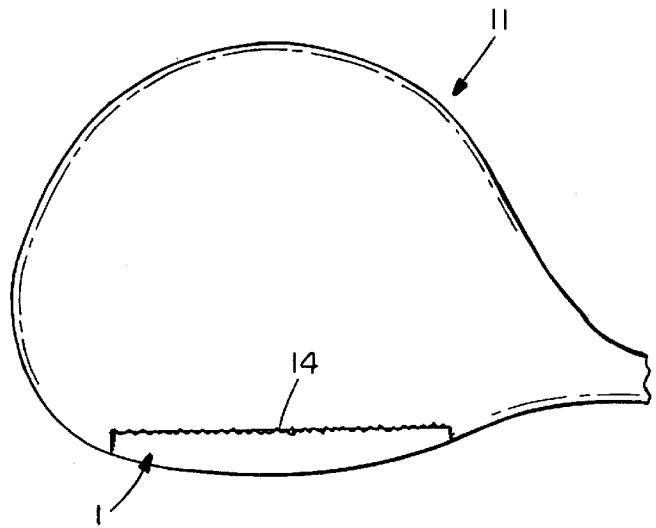
FIG. 3 is a bottom plan view of the metal wood shown in FIG. 2.

Referring to FIGS. 2–3, the embodiment illustrated is a "wood" type driver 10. The main body member 11, may be formed by casting from a metal such as stainless steel, aluminum, titanium, copper or other ductile materials, preferably metals or metal alloys. The strike face insert 1, as described herein, is fabricated from fiber reinforced metal matrix composite and abutted against the front surface of the main body member casting and joined to the casting, preferably by brazing or welding, along the joints 13. The joints 13 run along the perimeter of the strike face insert and the front opening of the main body member 11, thereby permitting integration of the strike face insert 1 with the main body member 11. The main body member has a recess portion 14 into which the periphery of the strike face insert 1 is fitted and joined. The joint 13 is generally trapezoidal or ellipsoidal in shape with an elongated top and bottom and a curved surface, the top curved surface being upward convex and the bottom curved surface being downward convex.

Insert 1, when used in woods, preferably has a compound curvature design element from toe to heel (known as bulge), and from top to bottom (known as roll).

Figure 5:
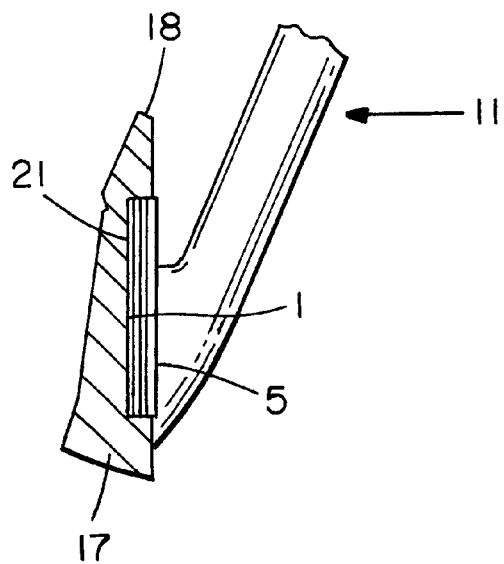
FIG. 5 is a cross section view taken on lines 5a—5a of FIG. 4.

Referring to FIGS. 4–5, an iron embodiment of the golf club head of the invention is illustrated. In FIG. 4, a main body member 11 is made of, for example, stainless steel, aluminum, cast iron or brass and has a substantially triangular transverse cross sectional profile so that its ball striking face 5 has a prescribed loft angle. As shown in FIG. 5, the sole face 17 is thicker than the top 18 of the head. Insert 1, comprising a fiber reinforced metal composite, is inserted to form the ball strike face 5 of the iron. The insert 1 is secured to the main body member 11 by brazing, welding, or by some other fastening means such that the entire interior (opposing) surface 7 of insert 1 is fastened to the interior surface 21 of the iron.

Any of the fiber/matrix preform methods currently used or known for metal matrix composites are technically feasible for insert applications. For cost considerations, a fiber array preform is preferably produced by placing the fibers in a parallel array and then surrounding the fibers with a slurry of metal matrix powder and an appropriate fugitive binder system.

The preferred method of forming the insert involves placing two to four layers of fiber array preforms between a top and bottom metal or metal alloy sheet. The metallic sheet layers are of a minimum thickness sufficient to form the insert without damage to the fibers or the fiber matrix interface. This layup is then consolidated to form a monolithic metal matrix by a solid state diffusion bonding process. The preferred fabrication method to achieve this consolidation involves stacking several large planar area layups in a vacuum hot press and applying appropriate heat and pressure to achieve 100% composite density (e.g., 500 to 2,000° C. at 100 to 10,000 psi for 5 minutes to 10 hours).

Individual club face inserts may be abrasive waterjet machined, stamped, or cut from the larger composite panels, and, optionally, have grooves machined or embossed into one face, followed by a brief forming operation (e.g., hot or cold die pressure) to achieve the desired curvature for metal wood applications.

The insert is preferably attached to a shelf within the main body member of the club head by welding, adhesive (epoxy) bonding, or brazing (e.g., vacuum brazing), but it may be secured by any means known in the art.

Specific enhancements observed for this fiber reinforced titanium composite insert include a 15 to 10 percent increase in club face stiffness, an a 20 to 30 percent weight savings in the hitting surface which can be redistributed to alter the center of inertial moment thereby increasing the desired hitting zone (i.e., a larger "sweet spot" can be achieved), relative to cast or forged metal strike face construction.

In a preferred embodiment, the exterior surfaces of the insert are two plies of titanium sheets. These sheets are laminated to an inner construction of an aluminum sheet faced on each side with an aluminum/silicon carbide fiber composite preform. This construction is consolidated to a monolithic composite in a vacuum hot press.

Other methods of composite fabrication, including molding of individual inserts, may be used, provided the fabrication method does not compromise fiber strength or composite integrity.

In the fabrication of the insert, the fiber is preferably located as close as possible to the striking surface insert surfaces and as far away as possible from the center line (or neutral axis) of the club head (running in the long direction of the insert) as possible. This fiber positioning maximizes strike face stiffness (modulus) and optimizes golf club performance. Multiple plies of fiber preforms and metal may be used. For cost reasons, two and four ply fiber preform/metal sheet are preferred, however, strength and stiffness generally improve as the number of fiber planar arrays increase. In addition, a single ply of composite may be attached to the back face of the insert, providing that a low temperature bonding or brazing process is utilized in joining the fiber composite to the insert.

The invention will now be further and specifically described by the following examples.

EXAMPLE 1

A silicon carbide fiber-reinforced titanium insert was prepared by layering: (a) 0.035 inch thick titanium foil (Ti-6-4); (b) four plies of 0.010 inch thick tape preform of a single layer parallel array of silicon carbide fibers in a preform tape of titanium powder; and (c) 0.035 inch thick titanium (Ti-6-4).

The inert elements were diffusion bonded in a vacuum hot press to form a fiber-reinforced titanium composite.

Strike face inserts were then machined with an abrasive waterjet from the composite. Grooves (0.02 inches, the maximum USGA striking face groove depth) were machined into the surface. Individual inserts were curved with a cold die and pressure to achieve the desired toe to heel and top to bottom curvature. A strike face insert, measuring about 2.5 inches in the long direction, and about 1.5 inches from top to bottom and 0.110 inches thick, was tested for surface deformation.

For testing, the insert was screw-mounted onto a contoured shelf which was machined into the face of a test fixture fabricated from mild steel. The test fixture was made in the general shape of a golf club head for a wood (driver). The test fixture head was attached to a golf club shaft mounted in a holder positioned such that golf balls shot by an air cannon at the strike face insert would hit the insert at controlled speeds.

A depth gauge was used to measure surface deformation at 6 fixed locations on the insert surface before and after testing with golf balls striking at a speed of 140 miles per hour.

A comparative test was run on the same insert having a thickness of only 0.105 inches. Results are shown in Table I below.

TABLE I

| | Deformation Depth (inches) | | | | | | |
|---|---|---|---|---|---|---|---|
| | 0.110 Inch Insert | | | | 0.105 Inch Insert | | |
| Number of Golf Ball Strikes | 0 | 50 | 100 | 150 | 0 | 25 | 50 |
| Location of Gauge Measurement: | | | | | | | |
| 1 (toe) | .148 | .148 | .149 | .150 | .320 | .320 | .300 |
| 2 (top) | .168 | .167 | .170 | .170 | .680 | .660 | .650 |
| 3 (heel) | .130 | .131 | .135 | .135 | .004 | .004 | .008 |
| 4 (bottom) | .172 | .171 | .175 | .174 | .670 | .660 | .660 |
| 5 (center) | .174 | .171 | .175 | .174 | .720 | .660 | .660 |
| 6 (center) | .173 | .170 | .173 | .173 | | | |

These results show the inserts are suitable for use in golf club heads. The resistance to deformation from golf ball strikes at 140 miles per hour was excellent for a 0.110 inch thick insert comprising a fiber reinforced metal composite. Similar resistance to deformation performance was obtained with fiber reinforced inserts having thicknesses of 0.120 to 0.115 inches. This is an improvement over non-reinforced metal strike inserts of the art which must be used at a greater thickness and a higher weight to achieve the same performance.

Results also demonstrate that a thickness in excess of 0.105 inch is preferred for a titanium/silicon carbide fiber strike face insert mounted in a wood-type club.

EXAMPLE 2

Strike face inserts were prepared as described in Example 1, except that various combinations of fiber layers and insert thicknesses were prepared, and the inserts were tested in iron clubs so that no curvature was made in the inserts.

The insert configurations prepared included: (a) 2 plies, each, of fiber reinforced titanium tape cast preform and of titanium foil (Ti-6-4) to yield a 0.120 inch thick insert; (b) the same as (a) except the insert was 0.110 inches thick; and (c) the same as (a) except the insert was 0.100 inches thick. The neutral axis of each insert was free of fiber reinforcement and comprised only titanium.

Each insert was tested in an iron club and performed as well as, or better than, monolithic iron clubs.

EXAMPLE 3

A driver golf club was assembled from an insert (0.100 inch thick) fabricated as in Example 1. The insert was welded onto a 0.010 to 0.005 inch deep shelf in the face of the cast metal main body member of the driver head. The insert was fitted to the shape of the shelf to provide a continuous joint between the main body member of the driver and the strike face insert.

The assembly performed well in the air cannon apparatus when struck with golf balls shot at 140 miles per hour.

Equivalents

Those skilled in the art will recognize, or be able to ascertain using no more than routine experimentation, many equivalents to specific embodiments of the invention described specifically herein. Such equivalents are intended to be encompassed in the scope of the following claims.

The invention claimed is:

1. A golf club head insert for striking a golf ball on a strike face of the insert, comprising a fiber-reinforced metal matrix, wherein the insert has a neutral axis and an opposing surface on an opposite side of the neutral axis from the strike face, and wherein fibers are present in greater concentration near the strike face and opposing surface of the insert than at the neutral axis.

2. The insert of claim 1, wherein the neutral axis of the insert consists essentially of metal matrix and is substantially free of reinforcing fiber.

3. The insert of claim 2, wherein the reinforcing fibers are disposed in at least one pair of fiber planar arrays which are oriented substantially parallel to the strike face, and wherein each fiber planar array in a pair is disposed on opposite sides of said neutral axis.

4. The insert of claim 3 wherein said insert contains one pair of fiber planar arrays.

5. The insert of claim 3 wherein said insert contains two pairs of fiber-planar arrays.

6. The insert of claim 3, wherein the metal matrix is selected from a group consisting of aluminum, aluminum alloy, magnesium, magnesium alloy, beryllium, beryllium alloys and or combinations thereof.

7. The insert of claim 3 wherein the metal matrix comprises titanium.

8. The insert of claim 3 wherein the metal matrix comprises a titanium alloy.

9. The insert of claim 3 wherein the reinforcing fiber is selected from the group consisting of boron-containing fibers, carbon-containing fibers, graphite-containing fibers and ceramic fibers.

10. The insert of claim 3 wherein the reinforcing fiber comprises silicon carbide-containing fibers.

11. A golf club comprising:

a) a main body member;

b) a strike face, comprising a fiber reinforced metal matrix insert wherein the insert has a neutral axis and an opposing surface on an opposite side of the neutral axis from the strike face and wherein fibers are present in greater concentration near the strike face and opposing surface of the insert than at the neutral axis; and c) means for joining the fiber reinforced metal composite insert to the main body member.

* * * * *